(12) United States Patent
Ueta et al.

(10) Patent No.: US 12,236,223 B2
(45) Date of Patent: Feb. 25, 2025

(54) SYSTEMS AND METHODS FOR SELECTING TEMPLATES FOR APPLICATION DEPLOYMENT

(71) Applicant: Hitachi, Ltd., Tokyo (JP)

(72) Inventors: Taisuke Ueta, San Jose, CA (US); Daisuke Ishii, Santa Clara, CA (US); Shoji Yunoki, Santa Clara, CA (US)

(73) Assignee: Hitachi, Ltd., Tokyo (JP)

(*) Notice: Subject to any disclaimer, the term of this patent is extended or adjusted under 35 U.S.C. 154(b) by 137 days.

(21) Appl. No.: 18/104,169

(22) Filed: Jan. 31, 2023

(65) Prior Publication Data

US 2024/0256243 A1 Aug. 1, 2024

(51) Int. Cl.
*G06F 8/61* (2018.01)
*H04L 67/10* (2022.01)

(52) U.S. Cl.
CPC ........... *G06F 8/61* (2013.01); *G06F 8/64* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 6,401,238 B1* | 6/2002 | Brown | ................ | G06F 8/61 709/224 |
| 7,013,462 B2* | 3/2006 | Zara | ................ | G06F 9/4411 717/176 |
| 8,468,542 B2* | 6/2013 | Jacobson | .............. | G06F 11/302 718/1 |
| 9,032,396 B2* | 5/2015 | Nakashima | ............. | H04W 4/60 717/177 |
| 9,038,055 B2* | 5/2015 | Mutisya | .............. | G06F 11/3688 717/172 |
| 11,153,173 B1* | 10/2021 | Rebeja | ................ | H04L 41/0806 |
| 2014/0325503 A1* | 10/2014 | Li | ............................. | G06F 8/61 717/177 |
| 2015/0074659 A1* | 3/2015 | Madsen | .............. | G06F 9/45558 717/177 |
| 2015/0347115 A1* | 12/2015 | Hong | .................. | H04L 67/1097 717/177 |
| 2017/0171024 A1* | 6/2017 | Anerousis | ........... | H04L 41/0883 |
| 2017/0277576 A1* | 9/2017 | Labasan | ................ | G06F 9/5083 |

(Continued)

*Primary Examiner* — Jason D Mitchell
(74) *Attorney, Agent, or Firm* — Procopio, Cory, Hargreaves & Savitch LLP

(57) ABSTRACT

A method for selecting templates for application deployment. The method may include storing, a plurality of templates for deploying applications into at least one of at least one edge server or at least one cloud server, wherein the at least one cloud server communicates with the at least one edge server through a network; receiving, from the at least one edge server, configuration information of a plurality of edge devices and the at least one edge server, and operation condition information of applications deployed, wherein the plurality of edge devices is in communication with the at least one edge server; receiving, from the at least one cloud server, infrastructure resource information of the at least one cloud server; and deploying, application by selecting at least one of the plurality of templates based on the configuration information, the operation condition information, and the infrastructure resource information.

16 Claims, 11 Drawing Sheets

(56) References Cited

U.S. PATENT DOCUMENTS

| | | | |
|---|---|---|---|
| 2020/0134057 A1* | 4/2020 | Kruempelmann | G06F 16/25 |
| 2020/0272503 A1* | 8/2020 | Macpherson | G06F 8/63 |
| 2021/0092188 A1* | 3/2021 | Guo | H04L 67/34 |
| 2022/0012165 A1* | 1/2022 | Chen | G06F 11/3051 |
| 2022/0091834 A1 | 3/2022 | Lu et al. | |
| 2022/0405127 A1* | 12/2022 | Huo | G06F 9/5027 |
| 2023/0205502 A1* | 6/2023 | Luthra | G06F 8/60 |
| | | | 717/177 |
| 2024/0202177 A1* | 6/2024 | Bandlamudi | G06F 16/2237 |
| 2024/0223535 A1* | 7/2024 | Luo | H04L 43/062 |
| 2024/0242505 A1* | 7/2024 | Yarlagadda | G06V 20/41 |
| 2024/0257396 A1* | 8/2024 | Wakai | G06T 7/80 |
| 2024/0257648 A1* | 8/2024 | Lo | G08G 5/0069 |

* cited by examiner

| Field ID | Selected template 1 | Selected template 2 | Selected template 3 | ... |
|---|---|---|---|---|
| 1 | Data processing template: ID 1 | Data management template: ID 1 | Edge processing template: ID 1 | |
| 2 | Data processing template: ID 2 | Data management template: ID 2 | Edge processing template: ID 1 | |
| 3 | Data processing template: ID 1 | Data management template: ID 1 | Edge processing template: ID 1 | |
| 4 | Data processing template: ID 3 | Data management template: ID 3 | Edge processing template: ID 2 | |
| 501 | 502 | 503 | 504 | |

FIG. 5

| Field ID | Field design | Edge computing resource |
| --- | --- | --- |
| 1 | Field server 104-1, Sensor 101-1, Device 102-1 | Field server<br>- Machine spec: Middle<br>- Available resource:<br>    - Core: X1<br>    - Memory: X2 |
| 2 | Field server 104-2, Controller 103-1, Sensor 101-2, Device 102-2 | Field server<br>- Machine spec: High<br>- Available resource:<br>    - Core: Y1<br>    - Memory: Y2 |
| 3 | Field server 104-3, Controller 103-2, Sensor 101-3, Device 102-3 | Field server<br>- Machine spec: High<br>- Available resource:<br>    - Core: Z1<br>    - Memory: Z2 |
| 4 | Field gateway 105, Sensor 101-4, Device 102-4 | Field gateway<br>- Machine spec: Low<br>- Available resource:<br>    - |

| Data processing template ID | Specification |
|---|---|
| 11 | Performance: middle<br>Location: Cloud<br>Reliability level: middle |
| 12 | Performance: middle<br>Location: Cloud<br>Reliability level: high |
| 13 | Performance: middle<br>Location: Cloud<br>Reliability level: low |

FIG. 10

SYSTEMS AND METHODS FOR SELECTING TEMPLATES FOR APPLICATION DEPLOYMENT

BACKGROUND

Field

The present disclosure is generally directed to a method and a system for selecting templates for application deployment.

Related Art

In recent years, edge-cloud system, the collaboration of edge computing and cloud computing, has been attracting attention with data growth due to the rapid development of Internet of Things (IoT) and 5G. Based on requirements of applications, IoT data may be processed at an edge, on a cloud, or somewhere in between. The more IoT data the system gathers or the more advanced process it executes, the more complicated things become due to the number of applications processing the data and/or the amount of computing resource to be allocated. In edge-cloud system, applications are expected to be deployed flexibly so as to allow easy installation by that users.

In the related art, a method of deploying applications to edge computing nodes as background processing by creating target application model is disclosed. The method, however, does not disclose deployment of applications that takes into consideration system performance as well as field sites. As edge servers are resource-limited depending on field site and cloud servers have different performance levels associated with operation cost, it is important to deploy applications at an edge or on a cloud while taking the computing resource of applications and the operation priority or preference of users into account.

In addition, edge-cloud system is expected to have the scalability to expand the system to other fields. It is also important to provide templates that can facilitate streamlined application deployment, and balance between the performance of applications, the operation priority/preference of users, and the environment of field sites.

SUMMARY

Aspects of the present disclosure involve an innovative method for selecting templates for application deployment. The method may include storing, by a management server, a plurality of templates for deploying applications into at least one of at least one edge server or at least one cloud server, wherein the at least one cloud server communicates with the at least one edge server through a network; receiving, by the management server from the at least one edge server, configuration information of a plurality of edge devices and the at least one edge server, and operation condition information of applications deployed, wherein the plurality of edge devices is in communication with the at least one edge server; receiving, by the management server from the at least one cloud server, infrastructure resource information of the at least one cloud server; and deploying, by the management server, application by selecting at least one of the plurality of templates based on the configuration information, the operation condition information, and the infrastructure resource information.

Aspects of the present disclosure involve an innovative non-transitory computer readable medium, storing instructions for selecting templates for application deployment. The instructions may include storing, by a management server, a plurality of templates for deploying applications into at least one of at least one edge server or at least one cloud server, wherein the at least one cloud server communicates with the at least one edge server through a network; receiving, by the management server from the at least one edge server, configuration information of a plurality of edge devices and the at least one edge server, and operation condition information of applications deployed, wherein the plurality of edge devices is in communication with the at least one edge server; receiving, by the management server from the at least one cloud server, infrastructure resource information of the at least one cloud server; and deploying, by the management server, application by selecting at least one of the plurality of templates based on the configuration information, the operation condition information, and the infrastructure resource information.

Aspects of the present disclosure involve an innovative server system for selecting templates for application deployment. The server system may include storing, by a management server, a plurality of templates for deploying applications into at least one of at least one edge server or at least one cloud server, wherein the at least one cloud server communicates with the at least one edge server through a network; receiving, by the management server from the at least one edge server, configuration information of a plurality of edge devices and the at least one edge server, and operation condition information of applications deployed, wherein the plurality of edge devices is in communication with the at least one edge server; receiving, by the management server from the at least one cloud server, infrastructure resource information of the at least one cloud server; and deploying, by the management server, application by selecting at least one of the plurality of templates based on the configuration information, the operation condition information, and the infrastructure resource information.

Aspects of the present disclosure involve an innovative system for selecting templates for application deployment. The system can include means for storing, by a management server, a plurality of templates for deploying applications into at least one of at least one edge server or at least one cloud server, wherein the at least one cloud server communicates with the at least one edge server through a network; means for receiving, by the management server from the at least one edge server, configuration information of a plurality of edge devices and the at least one edge server, and operation condition information of applications deployed, wherein the plurality of edge devices is in communication with the at least one edge server; means for receiving, by the management server from the at least one cloud server, infrastructure resource information of the at least one cloud server; and means for deploying, by the management server, application by selecting at least one of the plurality of templates based on the configuration information, the operation condition information, and the infrastructure resource information.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

FIG. 5 illustrates an example template selection, in accordance with an example implementation.

FIG. 6 illustrates an example field information table, in accordance with an example implementation.

FIG. 10 illustrates an example modified templates table, in accordance with an example implementation.

DETAILED DESCRIPTION

Figure 1:
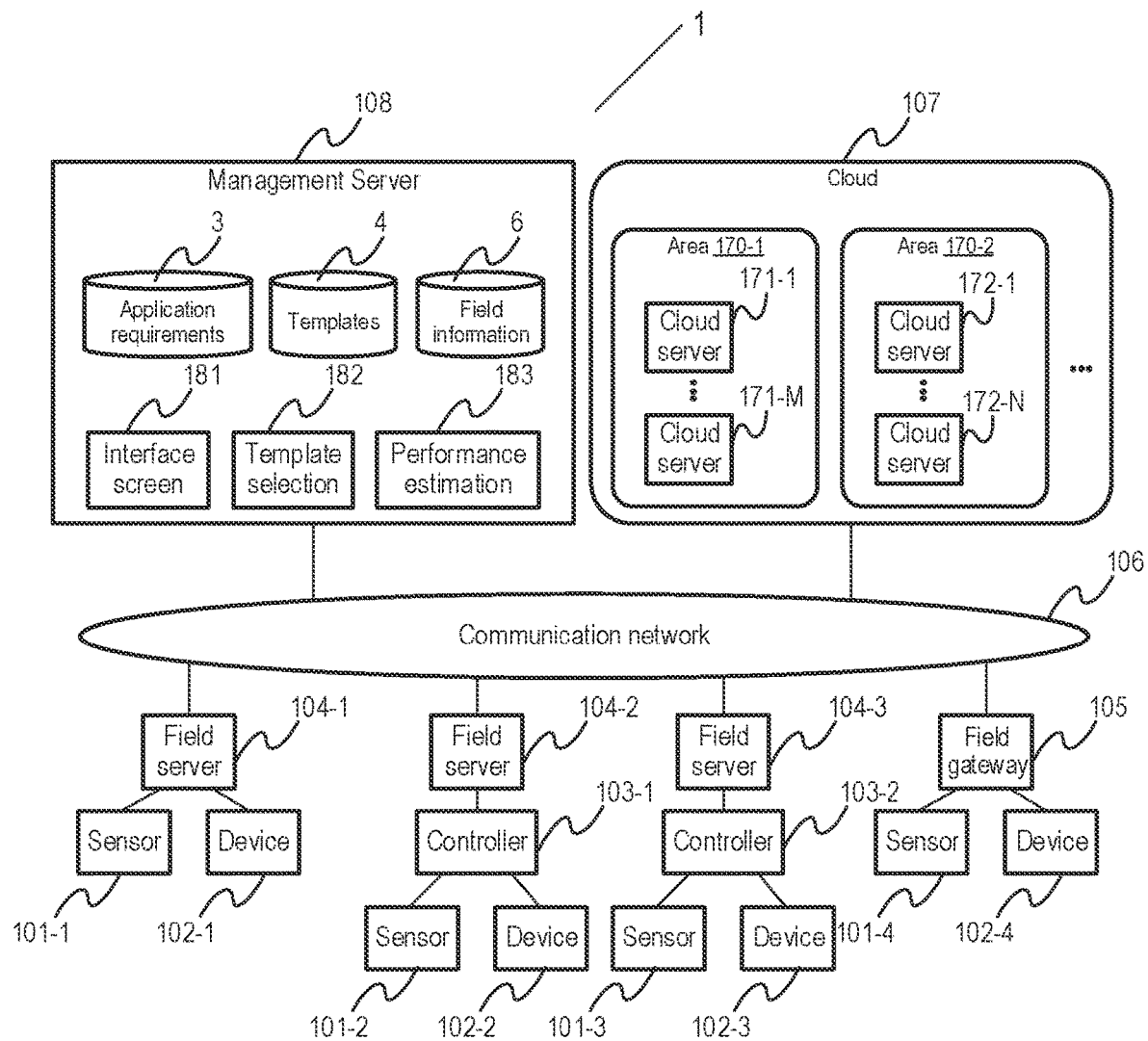
FIG. 1 illustrates an example system configuration diagram of information processing system 1, in accordance with an example implementation.

The following detailed description following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations provide an information processing system that selects templates for application deployment in edge-cloud system. The system provides flexible and reasonable deployment of applications by balancing the performance of applications, the operation priority or preference of users, and the environment of field sites.

FIG. 1 illustrates an example system configuration diagram of information processing system 1, in accordance with an example implementation. As illustrated in FIG. 1, the information processing system 1 may include components such as, but not limited to, sensors 101, devices 102, field servers 104, field gateway 105, communication network 106, cloud 107, and management server 108. The first field server, field server 104-1, connects with field devices such as first sensor, sensor 101-1, and first device, device 102-1, directly. The combination of the first field server 104-1, the first sensor 101-1, and the first device 102-1 constitutes the first field. The second field server 104-2 connects with the first controller 103-1 which controls field devices such as the second sensor 101-2 and the second device 102-2. Together, the second field server 104-2, the first controller 103-1, the second sensor 101-2, and the second device 102-2 constitute the second field. Similarly, the third field server 104-3 connects with the second controller 103-2 which controls field devices such as the third sensor 101-3 and the third device 102-3. The third field server 104-3, the second controller 103-2, the third sensor 101-3, and the third device 102-3 constitute the third field. The field gateway 105 connects with field devices such as the fourth sensor 101-4 and the fourth device 102-4 directly. The field gateway 105, the fourth sensor 101-4, and the fourth device 102-4 constitute the fourth field. Here, for example, the first field is a middle-scaled field. The second field and the third field are large-scaled fields compared to the first field, and the fourth field is a small-scaled field when compared to the first field.

Cloud 107 comprises a first area 170-1 which may include cloud servers 171-1 to 171-M, a second area 107-2 which may include cloud servers 172-1 to 172-N, etc. The first area 170-1, the second area 170-2, and other areas are collectively referred to as areas 170. The first cloud server 171-1 to the M-th cloud server 171-M are collectively referred to as the "cloud server(s) 171". The first cloud server 172-1 to the N-th cloud server 172-N are collectively referred to as the "cloud server(s) 172". Each area 170 is placed at a different physical location. The communication network 106 allows for communications and exchange of data across the various components of the information processing system 1.

The management server 108 may include application requirements table 3, templates table 4, field information table 6, interface screen 181, template selection 182, and performance estimation 183. The application requirements table 3 stores information that relate to operation condition requirements for applications deployed into the information processing system 1. The templates table 4 stores information of template data associated with the applications, which is a code designed to simplify the creation of infrastructure resources in the information processing system 1. The field information table 6 stores information pertaining to each field in the information processing system 1. The interface screen 181 receives requests for application registration. The template selection 182 is used for selecting templates from the templates table 4 based on the request. The performance estimation 183 calculates and estimates the cost of infrastructure resources, which is required as part of deployment based on the request.

Figure 2:
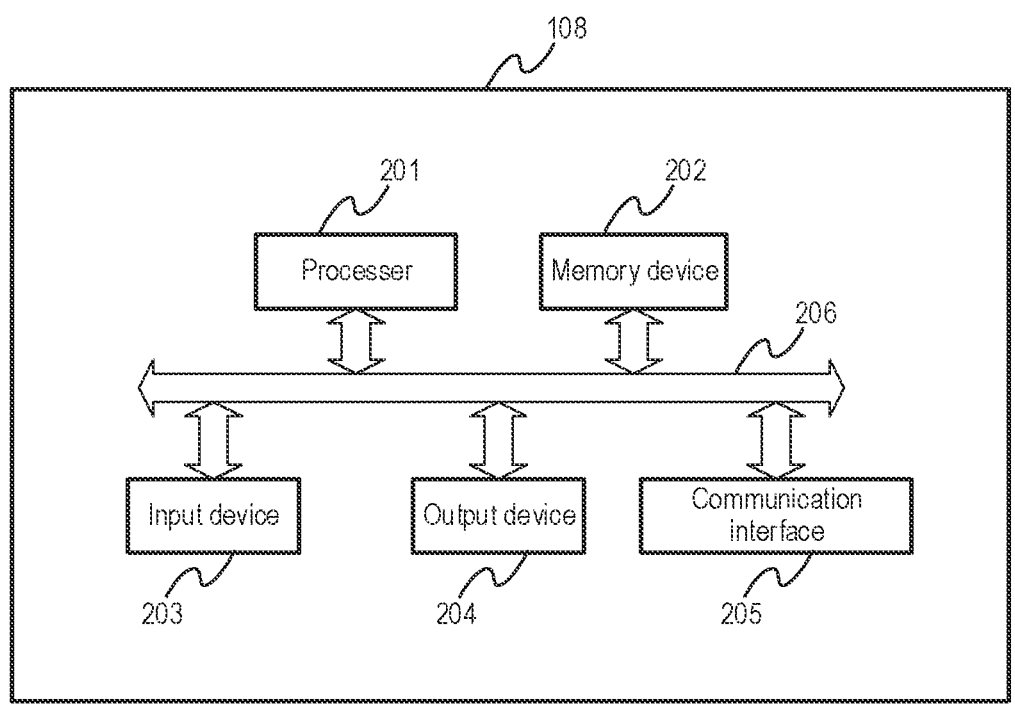
FIG. 2 illustrates an example hardware configuration diagram of the management server, in accordance with an example implementation.

FIG. 2 illustrates an example hardware configuration diagram of the management server 108, in accordance with an example implementation. The management server 108 may include hardware component such as, but not limited to, a processor 201, a memory device 202, an input device 203, an output device 204, and a communication interface 205, which are connected via bus 206. The processor 201 realizes the functions such as the interface screen 181, the template selection 182, and the performance estimation 183 as shown in FIG. 1, by reading the programs/instructions stored in the memory device 202.

The memory device 202 may comprise any of ROM (Read Only Memory), RAM (Random Access Memory), HDD (Hard Disk Drive), flash memory, etc. The memory device 202 may also store the information of the application requirements table 3, the templates table 4, and the field information table 6 shown in FIG. 1. The input device 203 receives data input and may be a device such as keyboard, a mouse, or a touch screen. The output device 204 outputs data through device such as a graphic user interface (GUI) or a printer. The communication interface 205 is an interface which sends and receives data via the communication network 106. In some example implementations, the hardware of the processor 201, the memory device 202, the input device 203, the output device 204, and the communication interface 205 may each be configured on a server as one or more devices, or a plurality of pieces of hardware may be configured on a server as a single device. In some example implementations, the management server 108 is configured on a cloud server 171 or a cloud server 172.

Figure 3:
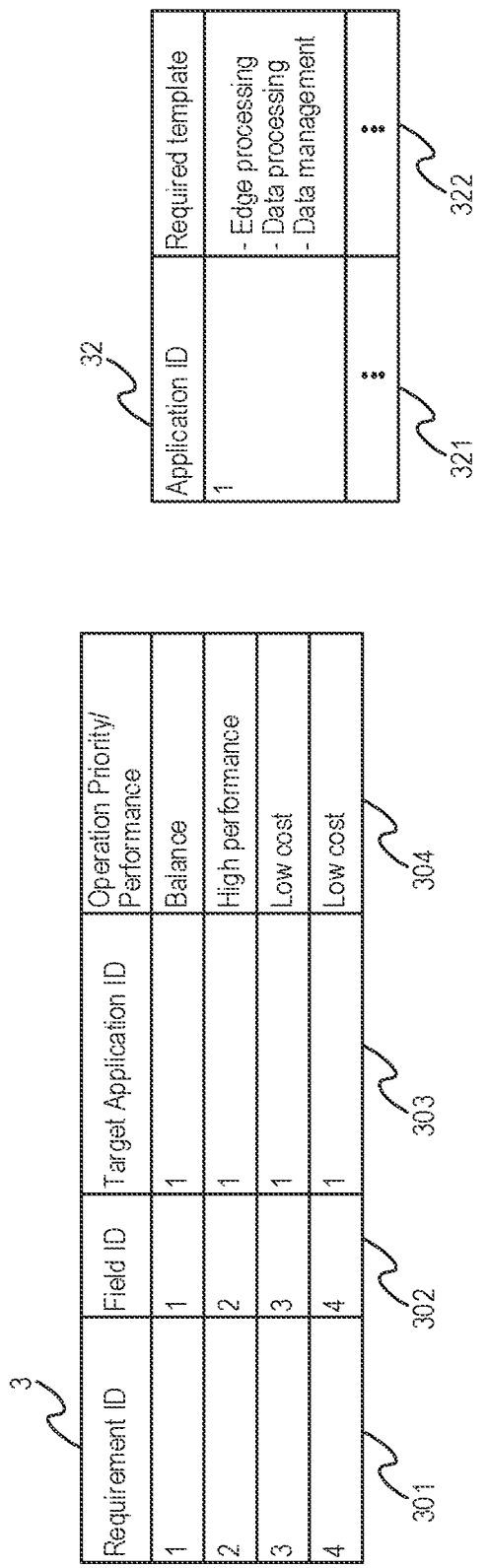
FIG. 3 illustrates an example application requirements table, in accordance with an example implementation.

FIG. 3 illustrates an example application requirements table 3, in accordance with an example implementation. The application requirements table 3 stores information of operation condition requirements for applications. The application requirements table 3 may include fields such as, but not limited to, field ID 302, target application ID 303, and operation priority/preference 304 associated with each requirement ID 301. The field ID 302 corresponds to the field identifier as described in FIG. 1. For example, a first field would have a field ID of "1". The target application ID 303 identifies application registered through the interface screen 181. The operation priority/preference 304 identifies operation condition requirements for the application.

In some example implementations, the application requirements table 3 may also store relation information between applications and templates. The application requirements table 3 may include the field of required template 322 for each application ID 321 as shown in table 32. As illustrated in FIG. 3, the application whose application ID is '1' has required template that comprises edge processing, data processing, and data management. For example, edge processing may be an image preprocessing procedure for computer vision that reduces the amount of data transferred to the cloud 107. Data processing may involve collection and manipulation of data to produce meaningful information such as image feature extraction. Data management may involve processes of ingesting, storing, and maintaining the data.

Figure 4:
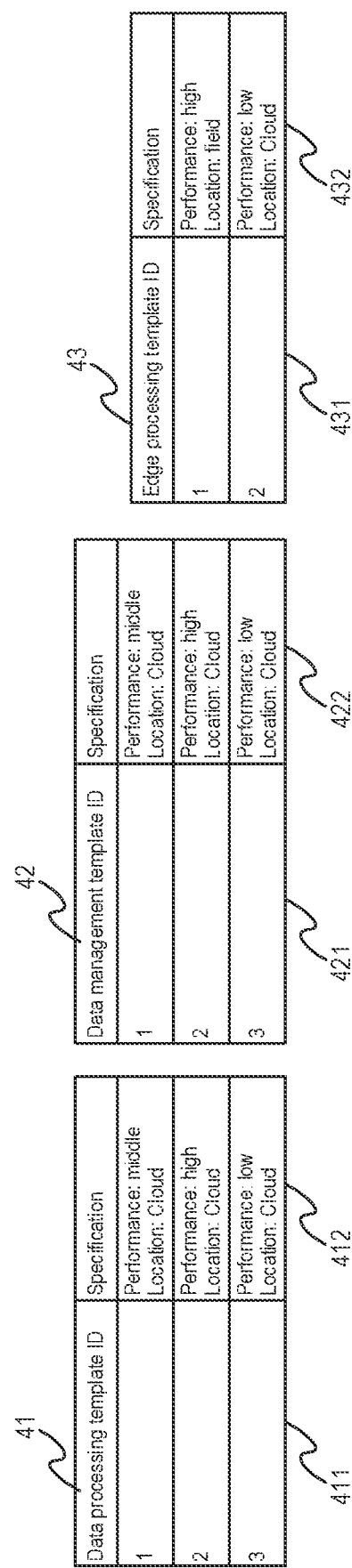
FIG. 4 illustrates an example templates table, in accordance with an example implementation.

FIG. 4 illustrates an example templates table 4, in accordance with an example implementation. The templates table 4 stores template data associated with applications, which is a code designed to simplify the creation of infrastructure resources. As illustrated in FIG. 4, each of the required three templates associated with the application ID of "1" shown in FIG. 3 is stored separately into table 41, table 42, and table 43 respectively. Table 41 includes fields of data processing template ID 411 and specification 412. Here, the table 41 includes three templates that indicate three different performance levels of middle, high, and low. For instance, the first line shown in the table 41, "1" is stored in the data processing template ID 411 and "Performance: middle/Location: Cloud" is stored in the specification 412. In other words, when a template whose data processing template ID is "1" is selected, the corresponding performance level of data processing is middle, and the process is executed at cloud 107.

Table 42 includes fields of data management template ID 421 and specification 422. Here, the table 42 includes three templates that indicate three different performance levels of middle, high, and low, each having cloud as process execution location. Table 43 includes fields of edge processing template ID 431 and specification 432. Here, the table 43 includes two templates that indicate two different performance levels of high and low, with corresponding locations of field and cloud.

FIG. 5 illustrates an example template selection 182, in accordance with an example implementation. Template selection 182 stores information of selected templates. The template selection 182 may include fields such as, but not limited to, selected template 1 (502), selected template 2 (503), selected template 3 (504), and etc. for each field ID 501. The field ID 501 corresponds to the field described in FIG. 1. Taking the first entry as example, "1" is stored in the field ID 501 and corresponds to the first field, "Data processing template: ID 1" is stored in the selected template 1 (502), "Data management template: ID 1" is stored in the selected template 2 (503), and "Edge processing template: ID 1" is stored in the selected template 3 (504). In other words, for the application that is executed at the first field, the template whose data processing template ID 411 of the table 41 is "1", the template whose data management template ID 421 of the table 42 is "1", and the template whose edge processing template ID 431 of the table 43 is "1" are selected.

FIG. 6 illustrates an example field information table 6, in accordance with an example implementation. The field information table 6 stores information pertaining to each field described in FIG. 1. The field information table 6 may include fields such as, but not limited to, field design 602 and edge computing resource 603 for each entry under field ID 601. The field ID 601 identifies the fields described in FIG. 1. Taking the first entry of the filed information table 6 as example, "1" is stored in the field ID 601, the field design 602 of the entry shows the combination of the first field server 104-1, the first sensor 101-1, and the first device 102-1 constituting the first field, and edge computing resource 603 shows "Field server/-Machine spec: Middle/-Available resource: /-Core: X1/-Memory: X2". In other words, the first field server 104-1 connects the first sensor 101-1 and the first device 102-1 as the first field and executes applications as the edge computing resource. The machine specification level of the first field server 104-1 is middle, and its available core and memory are "X1" and "X2" respectively.

Figure 7:
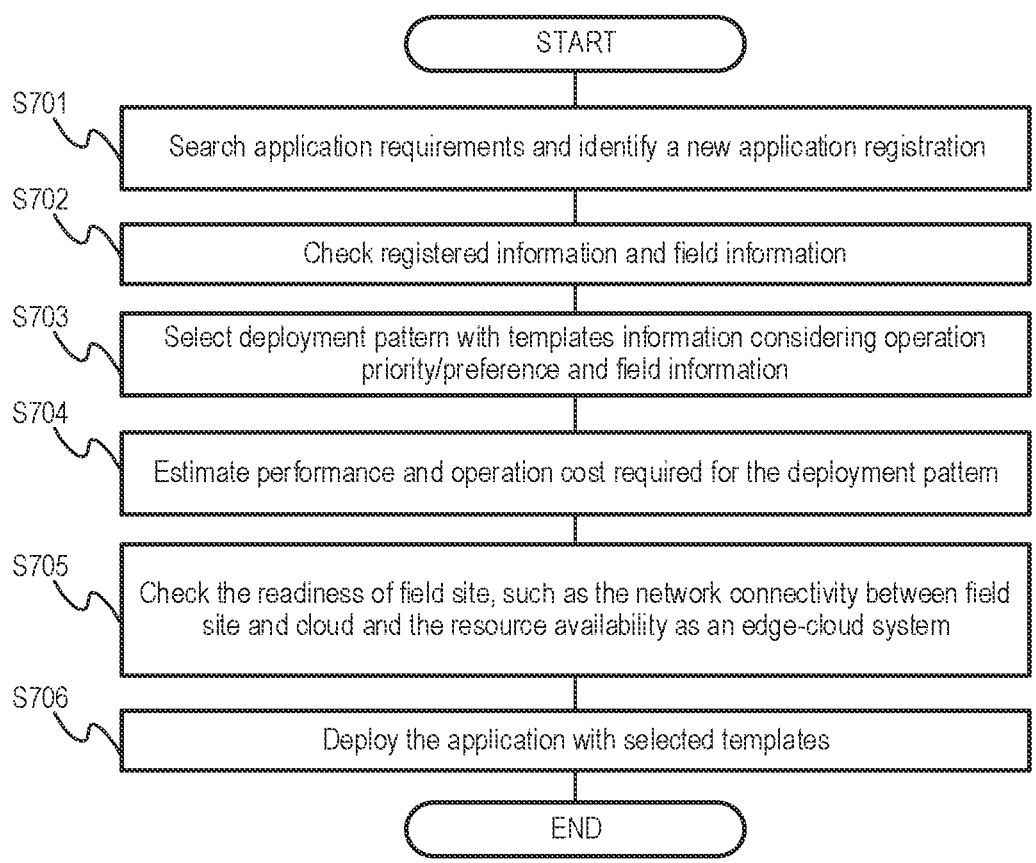
FIG. 7 illustrates an example process flow of the management server's template selection process, in accordance with an example implementation.

The management server 108 starts the execution when the application requirements table 3 is updated. The management server 108 may check for updates of the application requirements table 3 periodically. FIG. 7 illustrates an example process flow of the management server 108's template selection process, in accordance with an example implementation. The process begins at S701, where the management server 108 searches the application requirements table 3 and identifies a new application. Next, the management server 108 checks registered information of the application requirements table 3 and field information of the field information table 6 at S702. The management server 108 selects a deployment pattern, which is a template set as shown in FIG. 5, taking the operation priority/preference 304 and the field information into consideration at S703.

The management server 108 estimates the performance and the operation cost of infrastructure resources required for the deployment pattern at S704. The management server 108 makes an inquiry about information of the infrastructure resources to the cloud 107 and receives the information from the cloud 107. Here, the management server 108 may reselect the deployment pattern based on a balance between performance of applications, the operation priority/preference 304, and the field information such as the edge computing resource 603. Next, the management server 108 checks the readiness of field site, such as the network connectivity between field site and cloud and the resource availability of edge-cloud system at S705. At S706, the management server 108 deploys the registered application with the selected templates.

Figure 8:
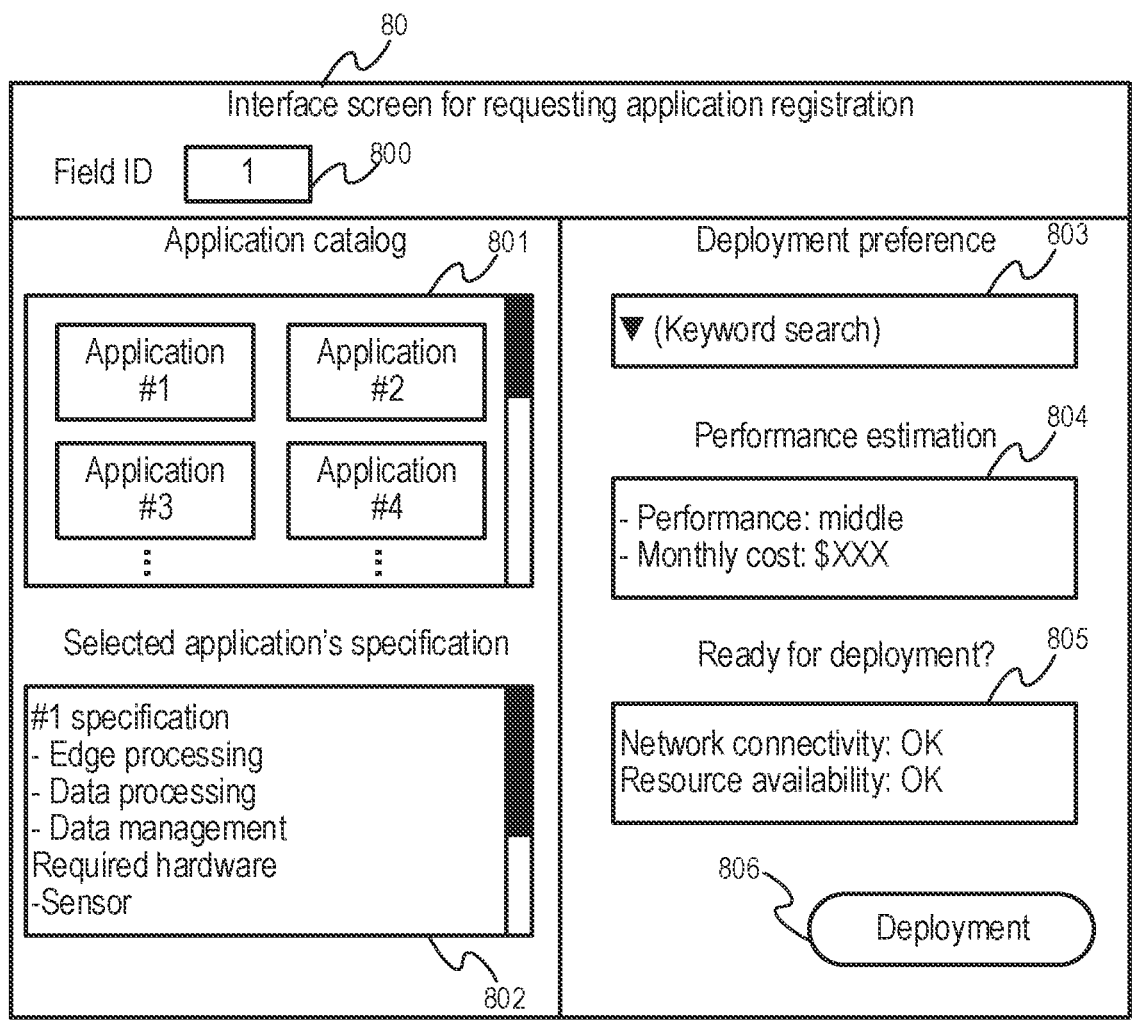
FIG. 8 illustrates an example interface screen for requesting application registration, in accordance with an example implementation.

FIG. 8 illustrates an example interface screen for requesting application registration 80, in accordance with an example implementation. User can connect to the management server 108 through the first field server 104-1, the second field server 104-2, the third field server 104-3, the field gateway 105, or the cloud 107 shown in FIG. 1, and request application registration with the interface screen 181 for requesting application registration. Simultaneously or before requesting application registration, the users provide their field information to the management server 108. The first field server 104-1, the second field server 104-2, the third field server 104-3, and the field gateway 105 may gather information associated with each field and send them to the management server 108.

As illustrated in FIG. 8, the interface screen for requesting application registration 80 may include application catalog 801, selected application's specification 802, deployment preference 803, performance estimation 804, ready for deployment 805, and a deployment button 806, for each entry of field ID 800. Field ID 800 shows the identification information of fields shown in FIG. 1. The field ID 800 may be determined and allotted by the management server 108 when users access the interface screen for requesting application registration 80. The application catalog 801 is the space for selecting the application that users would deploy to their fields. The selected application's specification 802 is the space for showing the specification of the application selected at the application catalog 801.

The deployment preference 803 is the space that users input their requirements of operation condition. For example, users may select keywords, such as "balance", "high performance", "low cost", and etc. as shown in FIG. 3, as their preference. Performance estimation 804 shows the estimate result, such as "performance", "monthly cost", and etc., based on both the application selected at the application catalog 801 and the operation condition requirements selected at the deployment preference 803. Users may reselect the keywords when the estimate results fail to meet their expectations. Ready for deployment 805 shows readiness for application deployment, such as "network connectivity" from the field identified by the field ID 800 to the cloud 107, "Available resource" of the edge computing resource 603 shown in FIG. 6, and etc., based on both the application selected at the application catalog 801 and operation condition requirements selected at the deployment preference 803. The deployment button 806 is pushed when users confirm their selection and application deployment is then initiated.

Figure 9:
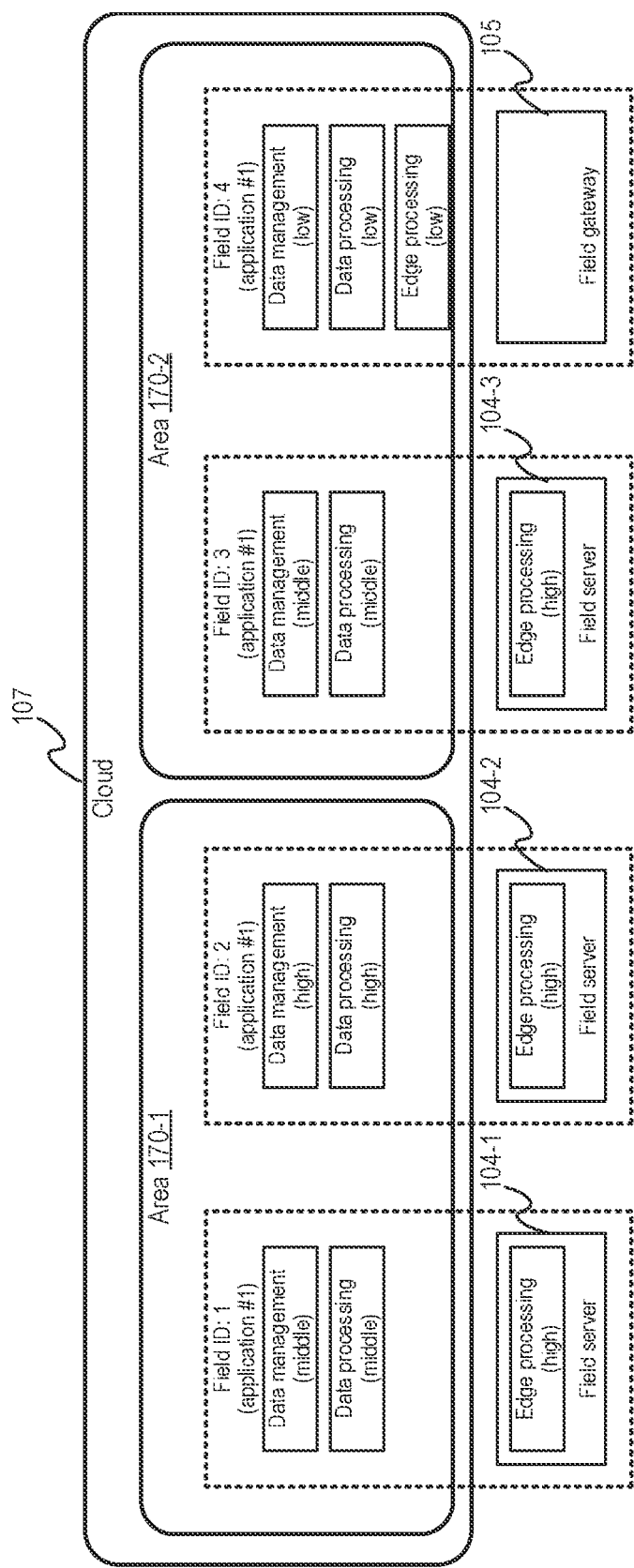
FIG. 9 illustrates an example application deployment in the information processing system 1, in accordance with an example implementation.

FIG. 9 illustrates an example application deployment in the information processing system 1, in accordance with an example implementation. Using deployment of application with the first field as example, the operation priority/preference 304 is "Balance" as shown in FIG. 3. Since the first field is a middle-scaled field, in making template selections, the management server 108 prioritizes templates having performance level of "middle" when balancing between the performance of applications, the operation priority or preference of users, the environment of field sites, etc.

Regarding the deployment of application for the second field, the operation priority of preference 304 is "High performance" as shown in FIG. 3. Since second field is a large-scaled field compared to the first field, in making template selections, the management server 108 prioritizes on templates having performance level of "high" even though the operation cost may increase based on such selection. In some example implementations, area within cloud 107 can be specified to reduce latency in communication. For example, the management server 108 may select the area 170-1 as the location of cloud server 171 to decrease network delay between the field server 104-2 and the cloud 107.

Regarding the deployment of application for the third field, the operation priority of preference 304 is "Low cost" as shown in FIG. 3. Since the third field is a large-scaled field, the management server 108 may select templates having performance level of "middle" given the large-scaled status.

Regarding the deployment of application for the fourth field, the operation priority of preference 304 is "Low cost" as shown in FIG. 3. Since the fourth field is a small-scaled field, the management server 108 prioritizes on templates having performance level of "low" so that the operation cost remains low. The management server 108 may select the edge processing template whose location is "cloud" and one of the cloud server 171 or the cloud server 172 may process the edge processing due to the lack of available resource for the field gateway 105 as shown in FIG. 6.

In some example implementations, the management server 108 may also take reliability level into consideration in selecting deployment pattern. Reliability may include information regarding redundancy, security, and privacy functions. The higher the reliability level, the more functions are deployed. In other words, the higher the reliability level, the higher the associated operating cost. In some example implementations, edge computing may be required regardless of the performance of application in view of privacy concerns.

FIG. 10 illustrates an example modified templates table 1000, in accordance with an example implementation. As illustrated in FIG. 10, the modified templates table 1000 may include fields such as, but not limited to, data processing template ID 1041 and specification 1042. In contrast from the templates table 4 as shown in FIG. 4, the specification 1042 includes "Reliability level" in addition to "Performance" and "Location". Taking the first entry of FIG. 10 as example, "11" is stored in the data processing template ID 1041 and "Performance: middle/Location: Cloud/Reliability level: middle" is stored in the specification 1042. In other words, when the template whose data processing template ID is "11" is selected, the performance level of data processing is middle, the process is executed at cloud 107, and the reliability level is middle.

The management server 108 may reselect templates and redeploy the applications based on occurrence of event having impact on applications, such as change of information of the field information table 6 (e.g., expansion or removal of field devices, etc.) Moreover, the management server 108 may reselect templates and redeploy the applications based on the operational performance of the applications or change of information of the application requirements table 3 (e.g., change in operation priority/preference 304, etc.)

The foregoing example implementations described above may be combined with each other. While the foregoing example implementations were described above, the present invention is not limited to the subject matter thereof. Other modes considered to fall within the technical scope of the present invention are also covered by the present invention. Moreover, the foregoing embodiment was explained in detail for explaining the present invention in an easy-to-understand manner, and the present invention does not need to necessarily comprise all of the configurations explained in the embodiment. Furthermore, control lines and information lines are illustrated to the extent required for explaining the present invention, and not all control lines and information lines required for the product may necessarily be indicated. In effect, it may be understood that nearly all of the configurations are mutually connected.

The foregoing example implementation may have various benefits and advantages. For example, utilizing the information processing system, applications can be flexibly deployed into an edge-cloud system. Additionally, flexible and reasonable deployment of applications by the edge-cloud systems is made possible by balancing the performance of applications, the operation priority/preference of users, the environment of field sites, etc.

Figure 11:
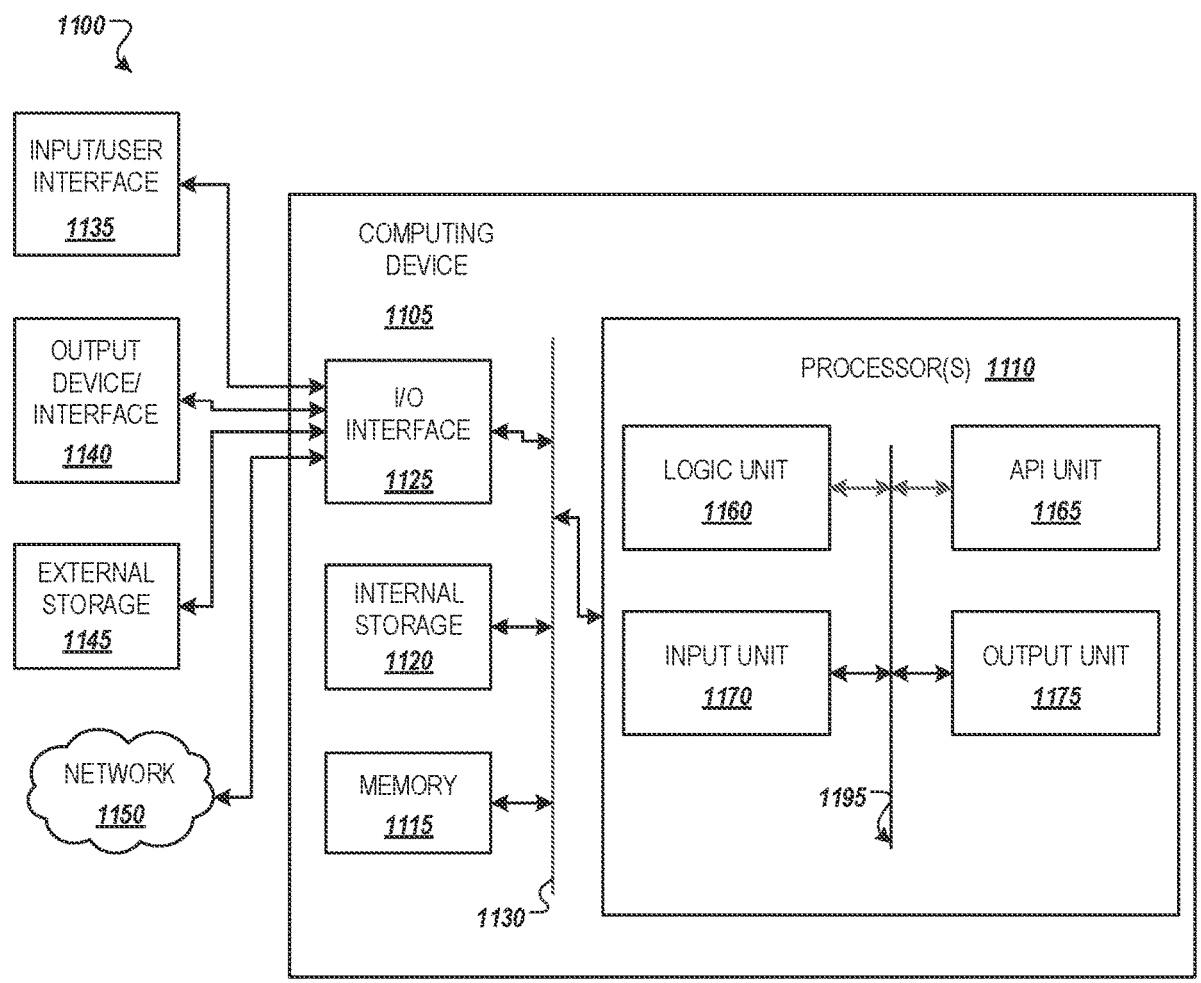
FIG. 11 illustrates an example computing environment with an example computer device suitable for use in some example implementations.

FIG. 11 illustrates an example computing environment with an example computer device suitable for use in some example implementations. Computer device 1105 in computing environment 1100 can include one or more processing units, cores, or processors 1110, memory 1115 (e.g., RAM, ROM, and/or the like), internal storage 1120 (e.g., magnetic, optical, solid-state storage, and/or organic), and/or IO interface 1125, any of which can be coupled on a communication mechanism or bus 1130 for communicating information or embedded in the computer device 1105. IO interface 1125 is also configured to receive images from cameras or provide images to projectors or displays, depending on the desired implementation.

Computer device 1105 can be communicatively coupled to input/user interface 1135 and output device/interface 1140. Either one or both of the input/user interface 1135 and output device/interface 1140 can be a wired or wireless interface and can be detachable. Input/user interface 1135 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1140 may include a display, television, monitor, printer, speaker, braille, or the like. In some example implementations, input/user interface 1135 and output device/interface 1140 can be embedded with or physically coupled to the computer device 1105. In other example implementations, other computer devices may function as or provide the functions of input/user interface 1135 and output device/interface 1140 for a computer device 1105.

Examples of computer device 1105 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1105 can be communicatively coupled (e.g., via IO interface 1125) to external storage 1145 and network 1150 for communicating with any number of networked components, devices, and systems, including one or more computer devices of the same or different configuration. Computer device 1105 or any connected computer device can be functioning as, providing services of, or referred to as a server, client, thin server, general machine, special-purpose machine, or another label.

IO interface 1125 can include but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1100. Network 1150 can be any network or combination of networks (e.g., the Internet, local area network, wide area network, a telephonic network, a cellular network, satellite network, and the like).

Computer device 1105 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1105 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1110 can execute under any operating system (OS) (not shown), in a native or virtual environment. One or more applications can be deployed that include logic unit 1160, application programming interface (API) unit 1165, input unit 1170, output unit 1175, and inter-unit communication mechanism 1195 for the different units to communicate with each other, with the OS, and with other applications (not shown). The described units and elements can be varied in design, function, configuration, or implementation and are not limited to the descriptions provided. Processor(s) 1110 can be in the form of hardware processors such as central processing units (CPUs) or in a combination of hardware and software units.

In some example implementations, when information or an execution instruction is received by API unit 1165, it may be communicated to one or more other units (e.g., logic unit 1160, input unit 1170, output unit 1175). In some instances, logic unit 1160 may be configured to control the information flow among the units and direct the services provided by API unit 1165, the input unit 1170, the output unit 1175, in some example implementations described above. For example, the flow of one or more processes or implementations may be controlled by logic unit 1160 alone or in conjunction with API unit 1165. The input unit 1170 may be configured to obtain input for the calculations described in the example implementations, and the output unit 1175 may be configured to provide an output based on the calculations described in example implementations.

Processor(s) 1110 can be configured to store, by a management server, a plurality of templates for deploying applications into at least one of at least one edge server or at least one cloud server, wherein the at least one cloud server communicates with the at least one edge server through a network as illustrated in FIG. 1. The processor(s) 1110 may also be configured to receive, by the management server from the at least one edge server, configuration information of a plurality of edge devices and the at least one edge server, and operation condition information of applications deployed, wherein the plurality of edge devices is in communication with the at least one edge server as illustrated in FIG. 1. The processor(s) 1110 may also be configured to receive, by the management server from the at least one cloud server, infrastructure resource information of the at least one cloud server as illustrated in FIG. 1. The processor(s) 1110 may also be configured to deploy, by the management server, application by selecting at least one of the plurality of templates based on the configuration information, the operation condition information, and the infrastructure resource information as illustrated in FIG. 1.

The processor(s) 1110 may also be configured to search, by the management server, the operation condition information to identify a registered application as illustrated in FIG. 7. The processor(s) 1110 may also be configured to check, by the management server, registered information associated with the registered application and the configuration information, wherein the registered information is application identification information associated with the registered application that forms part of the operation condition information as illustrated in FIG. 7. The processor(s) 1110 may also be configured to select, by the management server, at least one template from the plurality of templates to generate a deployment pattern, wherein the select the at least one template from the plurality of templates is performed by matching the plurality of templates with the configuration information and operation priority or preference of the operation condition information associated with the registered application to identify the at least one template from the plurality of templates for selection as illustrated in FIG. 7. The processor(s) 1110 may also be configured to estimate, by the management server, performance and operation cost associated with the deployment pattern as illustrated in FIG. 7. The processor(s) 1110 may also be configured to deploy, by the management server, the registered application with the deployment pattern as illustrated in FIG. 7.

The processor(s) 1110 may also be configured to request application registration, wherein a user uses an interface to register an application for deployment by selecting registration requirements associated with the application to be registered, wherein performance estimation and deployment readiness are generated based on selected registration requirements associated with the application to be registered as illustrated in FIG. 8.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for selecting templates for application deployment, the method comprising:
 storing, by a management server, a plurality of templates for deploying applications into at least one of at least one edge server or at least one cloud server, wherein the at least one cloud server communicates with the at least one edge server through a network;
 receiving, by the management server from the at least one edge server, configuration information of a plurality of edge devices and the at least one edge server, and operation condition information of applications deployed, wherein the plurality of edge devices is in communication with the at least one edge server;

receiving, by the management server from the at least one cloud server, infrastructure resource information of the at least one cloud server;

deploying, by the management server, the application by selecting at least one of the plurality of templates based on the configuration information, the operation condition information, and the infrastructure resource information;

searching, by the management server, the operation condition information to identify a registered application;

checking, by the management server, registered information associated with the registered application and the configuration information, wherein the registered information is application identification information associated with the registered application that forms part of the operation condition information;

selecting, by the management server, at least one template from the plurality of templates to generate a deployment pattern, wherein the select selecting the at least one template from the plurality of templates is performed by matching the plurality of templates with the configuration information and operation priority or preference of the operation condition information associated with the registered application to identify the at least one template from the plurality of templates for selection;

estimating, by the management server, performance and operation cost associated with the deployment pattern; and deploying, by the management server, the registered application with the deployment pattern.

2. The method of claim 1, further comprising:
for event occurrence involving at least one of change of the configuration information, change of the operation condition information, or change in operational performance of deployed applications, performing template reselection over at least one application impacted by the event occurrence.

3. The method of claim 1, wherein each of the plurality of templates comprises a template identifier and a specification associated with template identifier,
wherein the specification comprises information on performance level of data processing and processing location, and
wherein the matching the plurality of templates with the configuration information and the operation priority or preference of the operation condition information associated with the registered application comprises matching specification of each of the plurality of templates with the configuration information and operation priority or preference of the operation condition information associated with the registered application.

4. The method of claim 3, wherein the specification of a template further comprises information on reliability level.

5. The method of claim 1, further comprising:
checking network connectivity between the at least one edge server and the at least one cloud server, and resource availability.

6. The method of claim 1, further comprising:
requesting application registration, wherein a user uses an interface to register an application for deployment by selecting registration requirements associated with the application to be registered,
wherein performance estimation and deployment readiness are generated based on selected registration requirements associated with the application to be registered.

7. The method of claim 1, wherein the operation condition information comprises application identifier, operation priority or preference, and required template, and
wherein the operation priority or preference identifies requirements of operation condition for an application.

8. The method of claim 1, wherein each application deployed has an associated deployment pattern, and
wherein each deployment pattern is a selection of at least one template from the plurality of templates.

9. An information processing system for selecting templates for application deployment, the
the system comprising:
at least one edge server;
a plurality of edge devices in communication with the at least one edge server;
at least one cloud server, wherein the at least one cloud server communicates with the at least one edge server through a network, and
a management server, wherein the management server is configured to:
store a plurality of templates for deploying applications into at least one of the at least one edge server or the at least one cloud server;
receive, from the at least one edge server, configuration information of the plurality of edge devices and the at least one edge server, and operation condition information of applications deployed into the information processing system;
receive, from the at least one cloud server, infrastructure resource information of the at least one cloud server;
deploy the application by selecting at least one of the plurality of templates based on the configuration information, the operation condition information, and the infrastructure resource information,
search the operation condition information to identify a registered application;
check registered information associated with the registered application and the configuration information, wherein the registered information is application identification information associated with the registered application that forms part of the operation condition information;
select at least one template from the plurality of templates to generate a deployment pattern, wherein the selecting the at least one template from the plurality of templates is performed by matching the plurality of templates with the configuration information and operation priority or preference of the operation condition information associated with the registered application to identify the at least one template from the plurality of templates for selection;
estimate performance and operation cost associated with the deployment pattern; and
deploy the registered application with the deployment pattern.

10. The system of claim 9, wherein the management server is further configured to:
for event occurrence involving at least one of change of the configuration information, change of the operation condition information, or change in operational performance of deployed applications, perform template reselection over at least one application impacted by the event occurrence.

11. The system of claim 9, wherein each of the plurality of templates comprises template identifier and specification associated with template identifier, wherein the specification comprises information on performance level of data processing and processing location, and wherein the matching the plurality of templates with the configuration information and the operation priority or preference of the operation condition information associated with the registered application comprises matching specification of each of the plurality of templates with the configuration information and operation priority or preference of the operation condition information associated with the registered application.

12. The system of claim 11, wherein the specification of a template further comprises information on reliability level.

13. The system of claim 9, wherein the management server is further configured to:

check network connectivity between the at least one edge server and the at least one cloud server, and resource availability of the information processing system.

14. The system of claim 9, further comprising:

an interface for requesting application registration, wherein a user uses the interface to register an application for deployment by selecting registration requirements associated with the application to be registered, wherein performance estimation and deployment readiness are generated based on selected registration requirements associated with the application to be registered.

15. The system of claim 9, wherein the operation condition information comprises application identifier, operation priority or preference, and required template, and wherein the operation priority or preference identifies requirements of operation condition for an application.

16. The system of claim 9, wherein each application deployed into the information processing system has an associated deployment pattern, and wherein each deployment pattern is a selection of at least one template from the plurality of templates.

* * * * *